Figure 1:
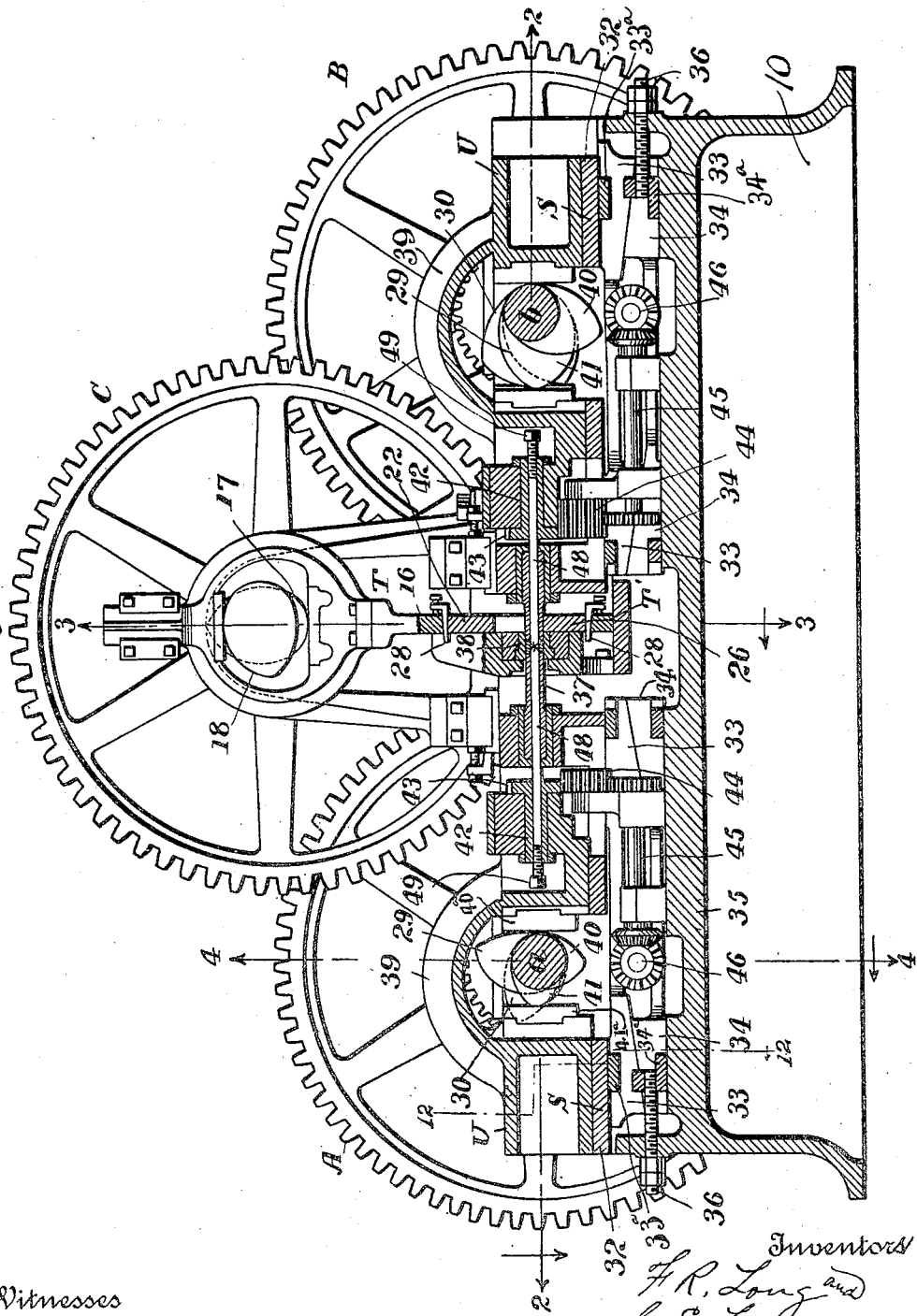

F. R. & C. E. LONG.
NUT MAKING MACHINE.
APPLICATION FILED NOV. 27, 1907.

938,599.

Patented Nov. 2, 1909.
5 SHEETS—SHEET 1.

Witnesses
Inventors

F. R. & C. E. LONG.
NUT MAKING MACHINE.
APPLICATION FILED NOV. 27, 1907.
938,599.
Patented Nov. 2, 1909.
5 SHEETS—SHEET 2.
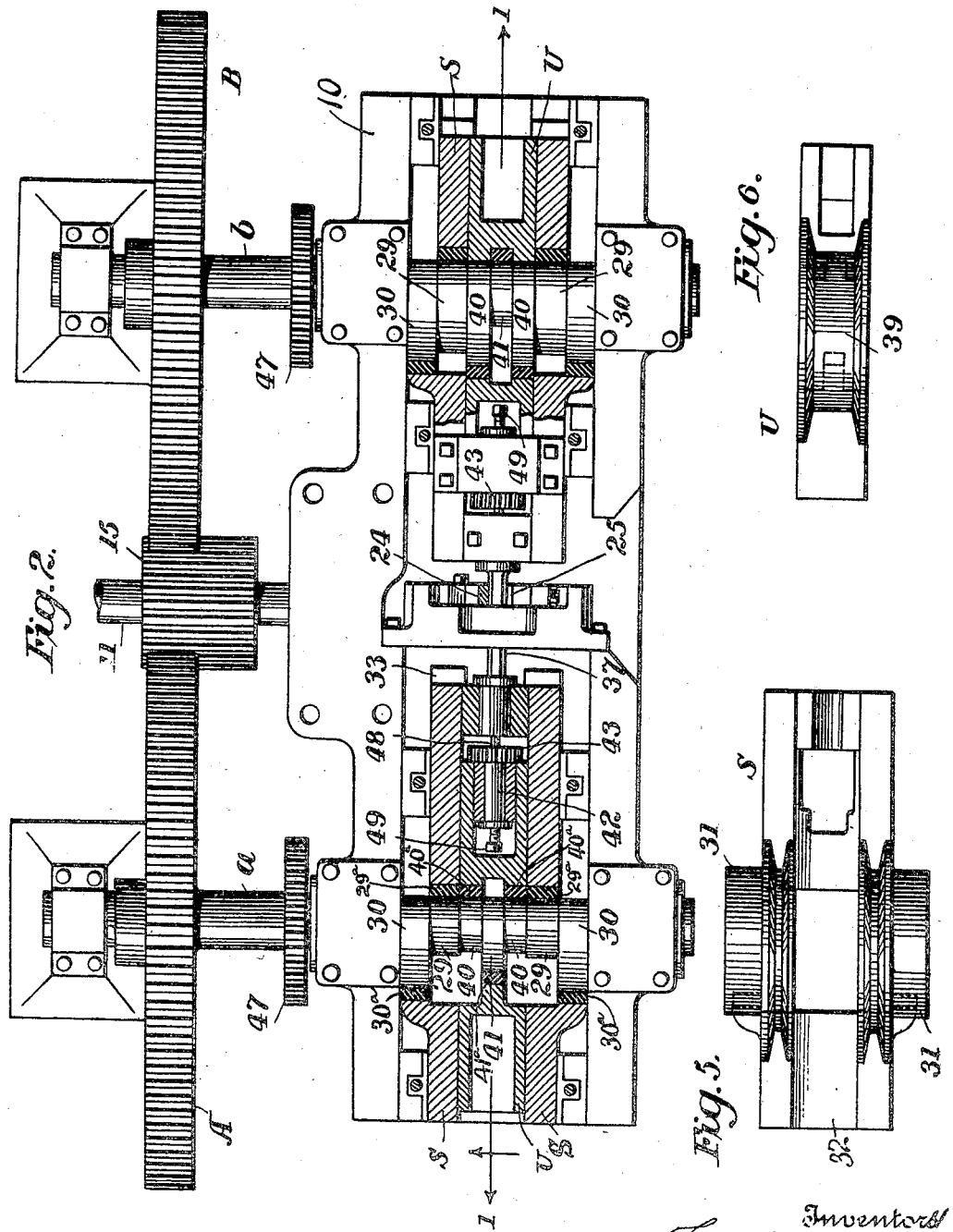

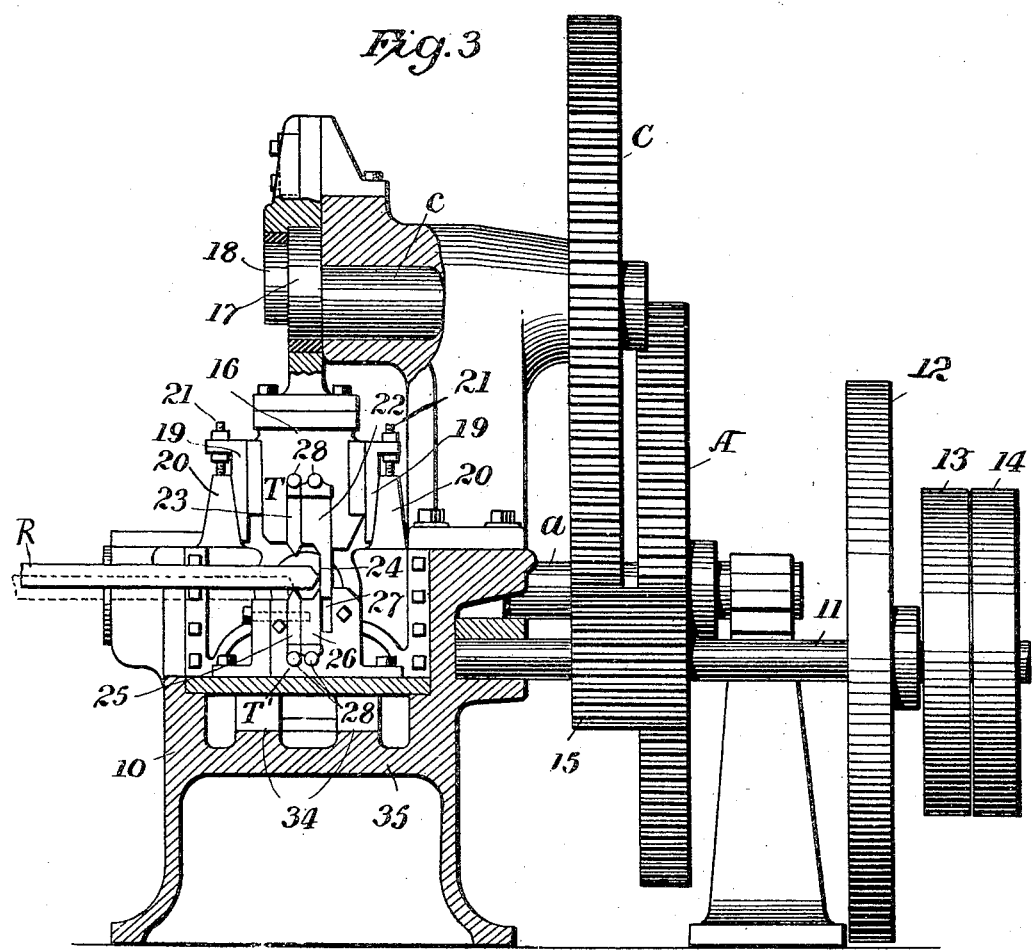
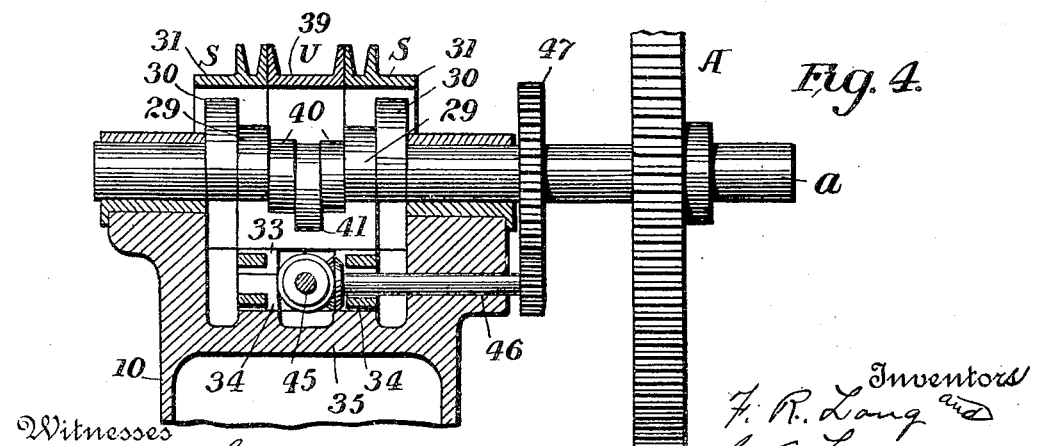

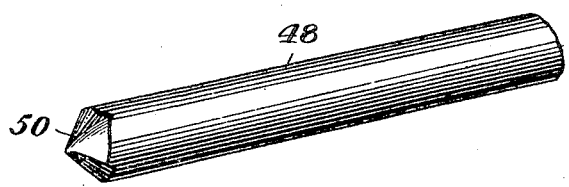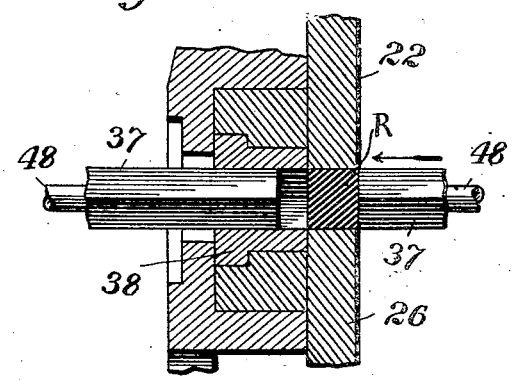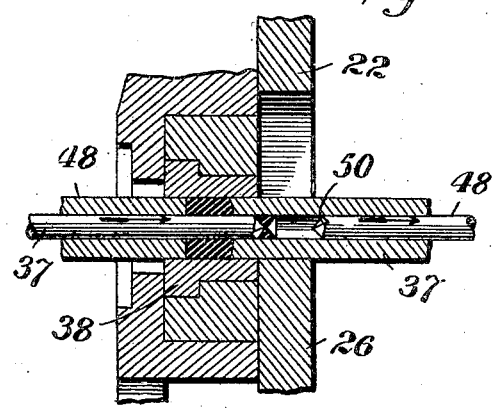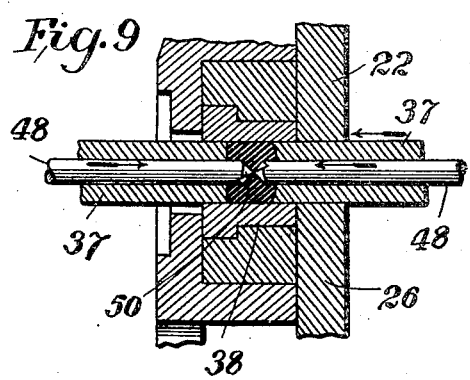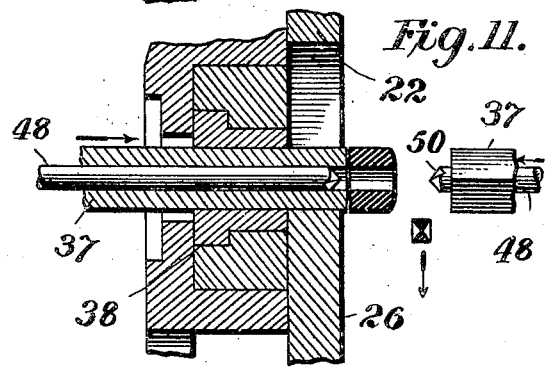

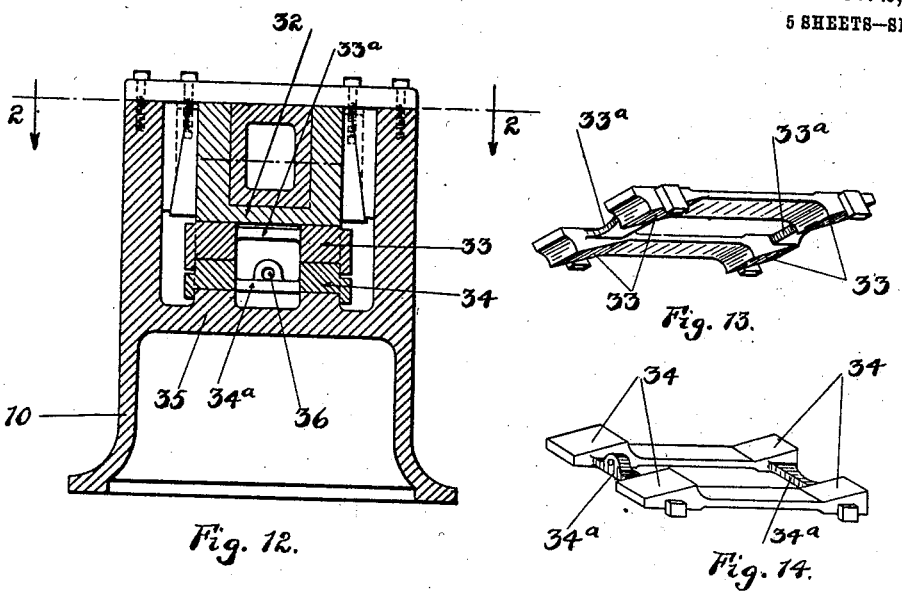
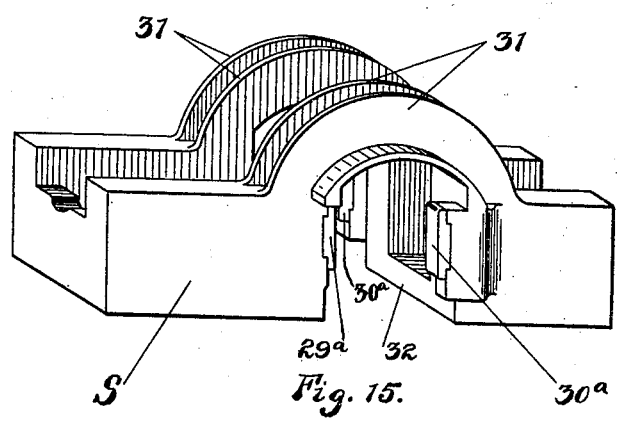
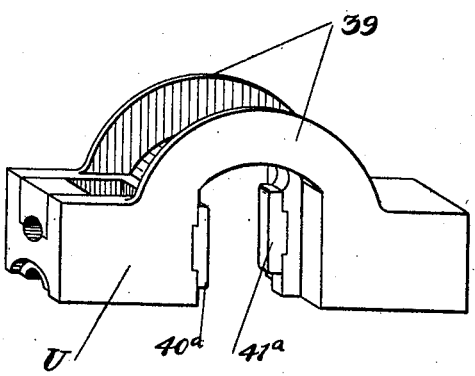

UNITED STATES PATENT OFFICE.

FREDERICK R. LONG AND CLINTON E. LONG, OF WILLIAMSPORT, PENNSYLVANIA, ASSIGNORS TO AMERICAN FORGED NUT COMPANY, OF BLOOMSBURG, PENNSYLVANIA, A CORPORATION OF PENNSYLVANIA.

NUT-MAKING MACHINE.

938,599.          Specification of Letters Patent.          Patented Nov. 2, 1909.

Application filed November 27, 1907. Serial No. 404,136.

*To all whom it may concern:*

Be it known that we, FREDERICK R. LONG and CLINTON E. LONG, citizens of the United States, and residents of Williamsport, Lycoming county, State of Pennsylvania, have invented certain new and useful Improvements in Nut-Making Machines, of which the following is a specification.

The object of the present invention is to produce a machine by means of which nut blanks of polygonal outline, and particularly hexagonal blanks, may be rapidly and economically produced.

The machine hereinafter described is adapted to form nut blanks of hexagonal outline from a bar of rectangular cross-section. The bar suitably heated, is fed into the machine step by step and the machine cuts from it sections which are roughly formed into hexagonal shape during the cutting operation. The blanks are then pressed into a hexagonal die, then pierced by tools which spread or expand the metal so as to fill the die and then ejected. The forming and piercing operations are performed without severing any material portion of the metal from the blank, practically the entire amount cut from the bar being transformed into a finished nut, partly by the compression in the die and partly by the expanding action of the piercers. A large percentage of waste which occurs in the present mode of manufacturing hexagonal nuts by trimming the outside and punching the holes is thus avoided.

The invention will be described in detail in connection with the accompanying drawing, in which, Figure 1 is a vertical section on the line 1—1 of Fig. 2; Fig. 2 is a horizontal section substantially on the line 2—2 of Fig. 1, and of Fig. 12, looking downwardly. Fig. 3 is a section on the line 3—3 of Fig. 1; Fig. 4 is a section on the line 4—4 of Fig. 1; Fig. 5 is a plan view of one of the slides which carry the formers; Fig. 6 is a plan view of slides which carry the piercers; Fig. 7 is a perspective view of one of the piercers; Figs. 8 to 11 inclusive are sectional views through the die and formers illustrating the operation of the machine; Fig. 12 is a transverse, vertical section taken on the plane indicated by line 12—12 of Fig. 1. Figs. 13 and 14 are detail perspective views respectively of the upper and lower adjusting wedges, hereinafter more fully described. Fig. 15 is a detail, perspective view of one of the former slides. Fig. 16 is a similar view of one of the piercer slides.

Referring to the drawings, 10 indicates a fixed frame of suitable construction for supporting the working parts of the machine, 11 the drive shaft, 12 the fly wheel on the drive shaft and 13, 14 fast and loose pulleys on said shaft. Three large gears A, B, C, are continuously driven by a pinion 15 on the drive shaft and these gears drive cam shafts $a$, $b$, $c$, respectively.

The rod R from which the blanks are cut is fed into the machine in any suitable manner to a forming and cutting-off tool T carried by a vertically moving slide 16 which is reciprocated by cams 17, 18, on the shaft $c$. One of said cams is designed to impart a slow downward movement to the cutting-off tool, while the other is designed to give it a quick return movement, thus utilizing the power of the machine to the best advantage. The slide 16 is mounted in adjustable guides 19 which have inclined bearings 20. The guides 19 are adjustably supported on bolts 21 which are fixed to the frame of the machine, as shown in Fig. 3. The cut-off tool T comprises a former 22 and a cutter 23. The cutter has a V-shaped edge, one face of which corresponds to one face of the finished nut blank, and the former 22 has a recess conforming to two faces of the nut blank and also has a finger 24 which extends downwardly and forms a stop for the rod R. Below the cutting-off tool T is a complementary tool T′ comprising a cutter 25, and a former 26. The cutting-off tool 25 has a V-shaped end similar to that of the tool 23 and the former 26 is recessed to conform to two sides of the nut blank. Adjacent to the former is a recess 27 in which the stop finger 24 reciprocates.

The cutting-off devices, which are shown particularly in Fig. 3, are so proportioned that the proper amount for the formation of a nut blank will be severed at each reciprocation of the cutter, the amount being determined by the distance between the cutters 23, 25 and the stop finger 24. When the cutting-off tool 23 is at its lowest point with its edge nearly in contact with the edge of the tool 25, the said tools and the formers 23 and 26 will then inclose the hexagonal space and compress the cut-off portion of the rod into hexagonal form. Each of the cutters and formers is supported by an adjustable wedge 28 (Figs. 1 and 3) which permits of accurate vertical adjustment of these parts to render the hexagonal opening of the proper size when the cutters are closed upon each other.

The parts operated by the cam shaft a are duplicates throughout of the corresponding parts operated by the cam shaft b, and it will only be necessary to describe in detail the mechanism at one end of the machine. The cam shaft a, at the left end of the machine, as viewed in Fig. 1, has a pair of cams 29 for giving a slow inward movement to a slide S by said cams acting against the wearing plates 29$^a$, 29$^a$, fixed to the outer end of the inner portion of the slide, and shaft a has a pair of cams 30 for imparting a rapid outward movement to said slide by contact with wearing plates 30$^a$, 30$^a$, fixed to the inner end of the outer portion of the slide. The portions of the slide on opposite sides of the cam shaft are connected by arches 31 and the slide S is provided with a flat bottom portion 32 which slides upon the upper faces of the upper wedges 33 which latter in turn rest upon the oppositely inclined faces of the wedges 34. The sets of wedges, 33 and 34, are connected by cross bars 33$^a$ and 34$^a$ respectively in the latter of which is a screw threaded opening for the adjusting screw 36. The wedges 34 slide upon the bottom plate 35 of the machine frame and it is evident that longitudinal movement of the wedges 34 will cause vertical adjustment of the slides S and U. This adjustment is effected by means of nuts on the outer end of the screw 36 which extends through the frame. Mounted in the inner end of the slide S is a hexagonal former 37 which is adapted to fit the hexagonal die 38 in which the nut blank is finished. The operation of the former will be described hereinafter. Supported in the slide S is a second slide U which has two parts on opposite sides of the cam shaft a connected by a bridge or arch 39. The slide U is operated in the inward direction by two cams 40 contacting with wearing plates 40$^a$, 40$^a$, fixed to the outer end of the inner portion of slide U, and said slide U is operated in the outward direction by a quick-return cam 41 contacting with wearing plate 41$^a$, fixed to the inner end of the outer portion of the slide. Mounted in a bearing in the inner end of slide U is a shaft 42 carrying a pinion 43 which is in mesh with a broad faced gear 44 adapted to drive the pinion 43 while it is being reciprocated by the cams 40, 41. The gear 44 is driven by a suitable train of gearing connecting it with the drive shaft. As shown it is driven through shafts 45 and 46, Figs. 1 and 4, the latter shaft being driven by a gear 47 on shaft a. A piercer 48 is mounted in the shaft 42 so that it will turn with said shaft and it is adjustable endwise therein by means of an adjusting screw 49. The piercer is preferably pointed and provided with a spiral formation 50 at its pointed end, as shown in Fig. 7. The piercer 48 extends axially through the former 37 and it rotates in said former and also reciprocates relatively thereto.

The parts at the right end of the machine associated with the cam shaft B are duplicates of the parts associated with the cam shaft A and like reference figures have been applied to them in the drawing, but it is deemed unnecessary to repeat the description of them.

The operation of the machine is as follows: The rod R, of rectangular cross section, is suitably heated and fed into the machine against the stop finger 24. The cutting and forming tool T then descends and cuts off a portion of the rod sufficient to form a nut blank and at the same time roughly shapes it into hexagonal form. The former 37 at the right end of the machine, (as viewed in Fig. 1) then moves inward from the position shown in Fig. 8 to that shown in Fig. 9, driving the blank into the die 38 into contact with the other member 37. Die 8 is rigidly supported in the machine. The right hand former 38 is preferably recessed to form a crown on the blank. The right hand piercer then advances, as shown in Fig. 9, crowding the metal radially outward and causing it to fill the die, the blank being held under compression by formers 37. The left hand piercer is then advanced to the position indicated in Fig. 9 and the right hand piercer is subsequently retracted, the left hand piercer in its initial advance completing the formation of the blank by further crowding the metal radially outward. The left hand piercer is next passed entirely through the blank, as shown in Fig. 10, and the left hand former 38 is then moved to the right stripping the completed blank from the piercer and the die, as shown in Fig. 11.

During the operation of the machine the piercers are continuously rotated. It is found that by rotating the piercer as it is inserted in and withdrawn from the blank, there is less cohesion between the piercer and the blank and it can be inserted and withdrawn with much less power than if it were not rotated. Furthermore by reason of the rotation of the piercer and the spiral formation on its point, the metal in the blank is spread more readily than could be effected by a non-rotating piercer and hence it flows into the angles of the die and forms a perfect blank of the same outline as the interior of the die.

The die 38 is preferably formed of chilled cast iron, while the formers are made of steel. We have found that a much better working fit can be made between the steel formers and a chilled cast die than is possible if the die and the formers are both made of steel. If both parts are steel they will stick together if fitted very closely in the operation of making hot pressed nuts and on the other hand if they are not made so as to fit closely burs will be left on the nuts which must be removed by a subsequent operation. By making the die of chilled cast iron and the formers of steel, we are enabled to produce so close a working fit that the blanks will be turned out substantially without burs and ready for use after being tapped.

Having described our invention what we claim and desire to secure by Letters Patent is, 1. In a machine of the class described, the combination with a die, of means for forming a nut blank therein comprising a pair of formers in axial alinement with the die, a pair of piercers axially arranged in the formers, former-slides carrying the formers, means for adjusting the former slides with respect to the die for maintenance of the alinement, and piercer slides carrying the piercers, the said piercer slides being mounted on the former slides.

2. In a machine of the class described, the combination with a die, of means for forming a nut blank therein comprising a pair of formers in axial alinement with the die, a pair of piercers axially arranged in the formers, former-slides carrying the formers, means for adjusting the former slides with respect to the die for maintenance of the alinement, piercer slides carrying the piercers, the said piercer slides being mounted on the former slides, and shafts having bearings in the piercer slides, the piercers being mounted in and arranged to turn with said shafts.

3. In a machine of the class described, the combination with a die, of a former in axial alinement with said die, a slide carrying said former, oppositely inclined wedges under said slide, means for adjusting said wedges to adjust the elevation of the former slide, a piercer slide supported on the former slide and a piercer carried by said piercer slide, said piercer being axially arranged in the former.

4. In a machine of the class described, the combination with a die, of means for forming a nut blank therein, comprising a pair of formers in axial alinement with the die, a pair of piercers axially arranged in the formers, former slides carrying the formers, piercer slides mounted on the former slides and carrying the piercers, and means for rotating the piercers.

5. In a machine of the class described, the combination with a die, a former in axial alinement with the die and a slide carrying the former, of a piercer axially arranged in the former, a rotating holder for the piercer, and means for adjustably supporting said piercer in said holder.

6. In a machine of the class described, the combination with a die, of means for forming a nut blank therein, comprising a pair of formers in axial alinement with the die, a pair of piercers axially arranged in the formers, former slides carrying the formers, piercer slides carrying the piercers, the said piercer slides being mounted on the former slides, and shafts having bearings in the piercer slides, the piercers being mounted in and arranged to turn with said shafts.

7. In a machine of the class described, the combination with a die, of a former and a piercer in axial alinement with the die, shiftable supporting means for said former and said piercer, reversely inclined wedges adapted to coöperate with said shiftable supporting means, and means for adjusting said wedges for adjusting the piercer and former for maintenance of the alinement.

8. In a machine of the class described, the combination with a die, of a former and a piercer in axial alinement with the die, nested slides carrying said former and said piercer, means for reciprocating the slides and means for rotating the piercer.

9. In a machine of the class described, the combination with a chilled cast iron die of steel formers having a working fit in said die.

10. In a machine of the class described, the combination with a die, of means for forming a nut blank therein, comprising a pair of formers in axial alinement with the die, a pair of piercers axially arranged in the formers, means for adjusting the formers and piercers for maintenance of the alinement, means for reciprocating the formers and piercers, and means for rotating the piercers.

11. In a machine of the class described, the combination with a die, of means for forming a nut blank therein, comprising a former in axial alinement with the die, a piercer axially arranged in the former, a former slide carrying the former, a piercer slide carrying the piercer, the said piercer slide being mounted on the former slide, and means for adjusting the piercer longitudinally with respect to its slide.

12. In a machine adapted to form expanded nut blanks, the combination of a die having a die recess, oppositely acting formers adapted to compress an interposed blank in said recess, piercers, means for advancing one of the piercers into the blank from one side while the blank is under compression, means for advancing the other piercer from the other side into the blank while the blank is under compression, means for subsequently withdrawing the first piercer, and means for passing the second piercer entirely through the blank.

13. In a machine adapted to form an expanded nut blank, the combination of a die panded having a die recess, formers adapted to compress a nut blank in said recess, a piercer, means for advancing the piercer into the nut blank from one end while the blank is held under compression, means for indenting the other end of the blank while the blank is held under compression and the piercer projects into the blank, means for subsequently retracting the piercer, and means for penetrating the blank along the axis of the indentation and the recess produced by the piercer.

14. In a machine adapted to form an expanded nut blank, the combination of a die having a die recess, oppositely acting formers adapted to compress an interposed nut blank in said recess, oppositely acting piercers adapted to indent said blank while under compression, means for advancing one of the piercers into the blank and retracting the same therefrom, while the blank is under compression, and means for advancing the other piercer into the blank subsequently to the advance of the first piercer and prior to the retraction thereof, and while the blank is under compression, and for passing the second piercer entirely through the blank subsequently to the retraction of the first piercer.

15. In a nut blank forming machine, the combination of a die having a die recess, two oppositely acting tubular formers adapted to compress an interposed blank in said recess, a piercer arranged in the bore of each former, means for advancing one of said piercers into the blank and withdrawing the same therefrom while the blank is under compression by the formers, and means for advancing the second piercer initially into the blank subsequently to the advance of the first piercer and prior to the withdrawal thereof and while the blank is held under compression, and for passing the second piercer entirely through the blank subsequently to the withdrawal of the first piercer.

16. In a machine adapted to form an expanded nut blank, the combination of a die panded nut blank, the combination of a die having a die recess, means for inserting an initially swaged blank into said die recess, reciprocatory aperture formers adapted to compress said blank while in said recess, one of said formers being said blank inserting means, a piercer arranged in the aperture of each apertured former and adapted to advance independently into said blank to expand the blank under compression while in said die recess, means for advancing one of said piercers into the blank while under compression in said die recess in advance of the other and to retain such piercer in the blank during the initial advance of the other piercer, means for initially advancing said other piercer into the blank while the blank is under compression, means for subsequently retracting the first piercer, and means for passing the second piercer subsequently entirely through the blank.

17. In a machine adapted to form an expanded nut blank, the combination of a die having a die recess, two oppositely acting formers, one of said formers being adapted to insert a nut blank into said die recess and to compress the blank therein against the other former, each of said formers being apertured, a piercer arranged in the aperture of each of said formers and means for alternately advancing the ends of said piercers into the blank while the blank is under compression in said die recess and for retaining the first piercer therein during the initial advance of the second piercer and for retracting the first piercer and passing the second piercer entirely through the blank.

18. In a machine adapted to form an expanded nut blank, the combination of a die having a die recess, means for compressing the ends of the nut blank within said die recess, means for indenting one end of the nut blank while the blank is under compression and for retaining the indenting means within the indentation temporarily and subsequently retracting the same, means for indenting the opposite end of the nut blank during the retention of the first mentioned indenting means within the first indentation while the nut blank is under compression, means for subsequently passing the second mentioned indenting means entirely through the nut blank following the retraction of the first mentioned indenting means.

19. In a machine adapted to form an expanded nut blank, the combination of a die having a die recess, oppositely acting apertured formers adapted to compress the opposite ends of a nut blank within said recess, piercers within the apertures of said formers, means for advancing one of the piercers into one end of the blank while the blank is under compression and subsequently retracting the piercer, means for advancing the other piercer into the opposite end of the blank after the advance of the first mentioned piercer and prior to the retraction thereof while the blank is under compression and for subsequently passing the second mentioned piercer entirely through the blank.

20. In a machine adapted to form an expanded nut blank, the combination of a die having a die recess, oppositely acting apertured formers adapted to compress the opposite ends of a nut blank within said recess, piercers within the apertures of said formers, means for advancing one of the piercers into one end of the blank while the blank is under compression and subsequently retracting the piercer, means for advancing the other piercer into the opposite end of the blank after the advance of the first mentioned piercer and prior to the retraction thereof while the blank is under compression, and means for rotating both of said piercers while entering the blank.

21. In a machine adapted to form an expanded nut blank, the combination of a die having a die recess, oppositely acting apertured formers adapted to compress the opposite ends of a nut blank within said recess, piercers within the apertures of said formers, means for advancing one of the piercers into one end of the blank while the blank is under compression and subsequently retracting the piercer, means for advancing the other piercer into the opposite end of the blank after the advance of the first mentioned piercer and prior to the retraction thereof while the blank is under compression, and means for rotating the piercers during the entire operation thereof.

22. In a machine adapted to form an expanded nut blank, the combination of a die having a die recess, oppositely acting apertured formers adapted to compress a nut blank within said recess, a piercer within the aperture of each former, means for advancing one of the piercers into the nut blank while the blank is under compression by the formers and for subsequently retracting the piercer, means for advancing the other piercer into the blank initially after the advance of the first mentioned piercer and prior to the retraction thereof while the blank is under compression by the formers, means for subsequently advancing the second mentioned piercer entirely through the blank, one of said piercers having a tapered entering end, and means for rotating the piercer having the tapered end.

23. In a machine for forming an expanded nut blank, the combination of a die having a die recess, oppositely acting recessed formers adapted to compress a nut blank within said recess, means for advancing one of the piercers into the nut blank while the blank is under compression by the formers and for subsequently retracting the piercer, means for advancing the other piercer into the nut blank subsequently to the advance of the first piercer and prior to the retraction thereof and while the blank is under compression by the formers, and for subsequently advancing the second mentioned piercer entirely through the blank, each of said piercers having a tapered entering end, and means for rotating said piercers.

24. In a machine adapted to form an expanded nut blank, the combination of a die having a die recess, oppositely acting recessed formers adapted to compress a nut blank within said die recess, piercers within the recesses of the formers, means for advancing one of the piercers into the nut blank while the blank is under compression by the formers and for subsequently retracting the piercer, means for advancing the other piercer initially into the nut blank subsequently to the advance of the first piercer and prior to the retraction thereof and while the nut blank is under compression by the formers and for subsequently passing the second piercer entirely through the nut blank, one of said piercers being formed with a tapered entering end and means for rotating one of the piercers.

25. In a machine adapted to form an expanded nut blank, the combination of a die having a die recess, oppositely acting recessed formers adapted to compress a nut blank within the said die recess, piercers within the recesses of the formers, means for advancing one of the piercers into the blank while the blank is under compression by the formers and for subsequently retracting the piercer, and means for advancing the other piercer initially into the blank subsequently to the advance of the first mentioned piercer and prior to the retraction thereof and while the blank is under compression by the formers, and for subsequently advancing the second piercer entirely through the blank, one of the piercers having a tapered entering end.

In testimony whereof we affix our signatures in presence of two witnesses.

FREDERICK R. LONG.
CLINTON E. LONG.

Witnesses:
  J. P. REEVES,
  JOHN E. ROGERS.